United States Patent [19]

Irie

[11] 4,452,577

[45] Jun. 5, 1984

[54] TIRE LOADER

[75] Inventor: Nobuhiko Irie, Nagasaki, Japan

[73] Assignee: Mitsubishi Jukogyo Kabushiki Kaisha, Tokyo, Japan

[21] Appl. No.: 509,233

[22] Filed: Jun. 28, 1983

[30] Foreign Application Priority Data

Jul. 9, 1982 [JP] Japan .................. 57-119222
Jul. 9, 1982 [JP] Japan .................. 57-119223
Jul. 9, 1982 [JP] Japan .................. 57-119224

[51] Int. Cl.³ .......................................... B29H 5/02
[52] U.S. Cl. ........................... 425/38; 425/33; 425/36
[58] Field of Search ............... 425/32, 33, 36, 43, 425/38

[56] References Cited

U.S. PATENT DOCUMENTS

| 3,167,810 | 2/1965 | Soderquist | 425/38 X |
|---|---|---|---|
| 3,222,715 | 12/1965 | Harris | 425/32 |
| 3,380,115 | 4/1968 | Soderquist | 425/38 |
| 3,396,221 | 8/1968 | Balle et al. | 425/43 X |
| 3,522,626 | 8/1970 | Balle | 425/38 X |
| 3,530,533 | 9/1970 | Turk et al. | 425/38 |
| 3,564,649 | 2/1971 | Soderquist | 425/36 X |
| 3,845,979 | 11/1974 | Schatg et al. | 425/38 X |
| 4,169,698 | 10/1979 | Turk et al. | 425/38 X |
| 4,279,438 | 7/1981 | Singh | 425/38 X |
| 4,338,069 | 7/1982 | Singh et al. | 425/38 |
| 4,401,422 | 8/1983 | Amano et al. | 425/38 |

Primary Examiner—J. Howard Flint, Jr.
Attorney, Agent, or Firm—Wenderoth, Lind & Ponack

[57] ABSTRACT

A tire loader for supplying a green tire into a vulcanizing press, comprising a plurality guide tracks extending radially outwardly, a plurality of grippers movably mounted on the guide tracks, respectively, for gripping a bead of the green tire in contact therewith, a plurality of fluid cylinders having rods connected respectively to the grippers and actuatable for moving the grippers along the guide tracks, and a stop for limiting the radially outward movement of the grippers along the guide tracks.

9 Claims, 13 Drawing Figures

TIRE LOADER

BACKGROUND OF THE INVENTION

The present invention relates to a tire loader for loading a green tire into a vulcanizing press.

As disclosed Japanese Patent Publications Nos. 46-22099, 46-38330, 50-31911, and 46-24773, one known type of tire loader includes a plurality of grippers interlinked by a link mechanism and openable and closable by a force applied vertically along a central axis against interconnected portions of the grippers. Another conventional tire loader has a movable disk having cam grooves for opening and closing grippers, as shown in Japanese Patent Publication No. 52-991.

The former tire loader construction is disadvantageous in that since the drive source such as a pneumatic cylinder is disposed in an axial direction, the grippers have an increased height, and it is necessary to provide a large space between upper and lower dies when they are opened. This causes a serious problem with a vertically movable press recently available to achieve an increased degree of accuracy. Specifically, the up-and-down stroke of the press needs to be increased by an increased height of the grippers which enter between the upper and lower dies, so that it takes a longer period of time for the press to be opened and closed and the overall press height becomes larger. Therefore, green tires cannot be pressed economically.

Another difficulty is that since the grippers depend from the swinging links, the grippers cannot be circularly arranged precisely due to errors in accuracy of the individual links and backlash in the swinging ends of the links.

The latter tire loader type also has various shortcomings. It is difficult to arrange the grippers circularly accurately as a number of complex cam grooves cannot be formed accurately in the cam disk. The cam disk is large in size and weight.

In addition, both tire loader types have the following common defects:

The grippers in the loaders are required to grip unvalcanized green tires with as small a force as possible. With the prior tire loaders, the movement of the grippers is limited by either limiting the movement of the drive source or providing the grippers respectively with stops for limiting their movement. The individual stops, six to eight stops, for example, on the grippers need to be adjusted each time a tire to be gripped has a different size. Since such frequent gripper adjustment is not preferred by the user, radial positions of the grippers are normally limited through limiting the movement of the drive source in most applications. With the link mechanism, however, the ratio of the movement of the drive source to the movement of the gripper varies with the radial gripper position. This requires extreme care and a long period of time to achieve a proper gripping diameter.

Figure 1:
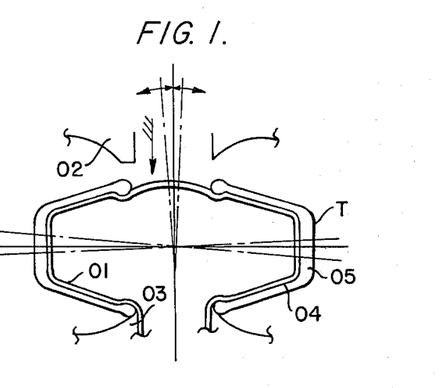
FIG. 1 is a schematic diagram showing the manner in which a green tire is loaded in a lower-bead-set-first system.
Figure 2:
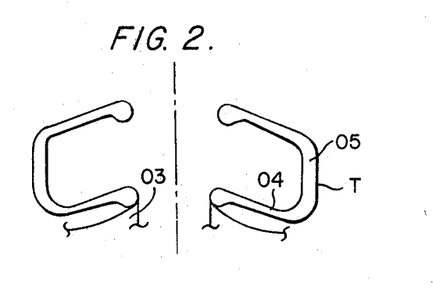
FIG. 2 is a schematic diagram illustrative of a difficulty with the lower-bead-set-first system.

The conventional tire loader operates such that the lower bead of a green tire is seated on the lower bead ring of a lower die while the upper bead of the tire is gripped. With such a lower-bead-set-first system, as shown in FIG. 1, the green tire T is positionally unstable and is supported by a bladder 01 inflated at an extremely low temperature. The green tire T tends to be tilted with respect to the central axis due to a slight irregularity of the bladder 01. The tire is sometimes likely to be seated erroneously on an upper bead ring 02. Such a problem can be solved by seating the tire on the lower bead ring 03, then on the upper bead ring 02, and finally by inflating the bladder 01. However, the tire would tend to collapse since the tire has side walls 04 of reduced rigidity and most of the weight concentrates on treads 05.

In the tire loader of the foregoing lower-bead-set-first arrangement, the upper bead of the green tire placed on a green tire mount disposed outside of the press is gripped from inside by expansible and contractible grippers lowered from above the green tire, or the treads of the green tire are gripped from outside. In any case, the green tire mount is needed in front of the press. Various dies are replaceably mounted in the press to provide a capability to vulcanize many kinds of tires. The green tire mount should be movable in order not to interfere with die replacement. The green tire mount should have adjustable tire holders for holding green tires of different sizes. Therefore, the known green tire mount has been expensive, resulting in an increase in the cost of the tire loaders.

To eliminate the difficulties with the conventional lower-bead-set-first tire loaders, the applicant has proposed a tire loader of the upper-bead-set-first type for seating the upper bead of a green tire on the upper bead ring of an upper die, seating the lower bead of the green tire on the lower bead ring of a lower die, and inflating a bladder in the green tire thus supported by the upper and lower bead rings to shape the green tire. The loader of such a construction has extensible and contractible grippers opening upwardly and mounted on a loader arm movable upwardly and downwardly and angularly movable horizontally. When the grippers grip the green tire to load the latter into the press, the grippers are required to be opened upwardly. If the grippers were open upwardly at the time the green tire is supplied in a first position outside of the press, then the following problems would arise: Since large-size tires have increased outside diameters and are heavy (about 100 Kg), they could not be manually brought onto the grippers remaining open upwardly. It would then be necessary to provide a complex and costly mechanical tire transfer device in front of the press or on a green tire supply carriage. This would increase the cost of the tire loader. The tire loader also has suffered the danger of allowing a green tire to collapse and be deformed under its own weight while the tire loader is holding the tire prior to vulcanization thereof. There is a need for some preventive measure to avoid such a problem.

SUMMARY OF THE INVENTION

It is an object of the present invention to provide a tire loader having a low profile with a gripper assembly of a reduced height to provide a minimum opening and closing stroke of a vertically movable press.

Another object of the present invention is to provide a tire loader having tire grippers which are easily adjustable for a desired gripping diameter and can be circularly arranged more accurately.

Still another object of the present invention is to provide a tire loader suitable for use in an upper-bead-set-first system.

A still further object of the present invention is to provide a tire loader which can be used for both upper-bead-set-first and lower-bead-set-first systems without suffering shortcomings experienced with prior tire loaders.

According to the present invention, there is provided a tire loader for supplying a green tire into a vulcanizing press, comprising a plurality guide tracks extending radially outwardly, a plurality of grippers movably mounted on the guide tracks, respectively, for gripping a bead of the green tire in contact therewith, a plurality of fluid cylinders having rods connected respectively to the grippers and actuatable for moving the grippers along the guide tracks, and a stop for limiting the radially outward movement of the grippers along the guide tracks.

According to another embodiment, a tire loader for supplying a green tire into a vulcanizing press comprises a plurality of grippers movable radially outwardly and inwardly for gripping a bead of the green tire, and a plurality of radially outward arms pivotably mounted on the grippers for supporting at least a tread shoulder of the green tire.

According to still another embodiment, a tire loader for supplying a green tire into a vulcanizing press comprises a plurality of grippers movable radially outwardly and inwardly for gripping a bead of the green tire, a horizontal shaft supporting thereon the grippers and rotatable about its own axis, first means for angularly moving the shaft in a horizontal direction, and second means for moving the shaft upwardly and downwardly.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A tire loader according to a first embodiment of the present invention will be described with reference to FIGS. 3 through 7.

Figure 3:
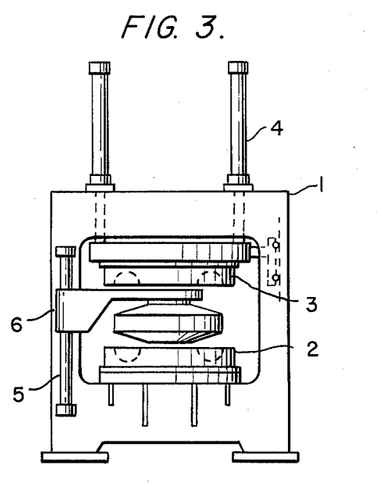
FIG. 3 is a front elevational view of a vulcanizing press incorporating a tire loader according to a first embodiment of the present invention.
Figure 4:
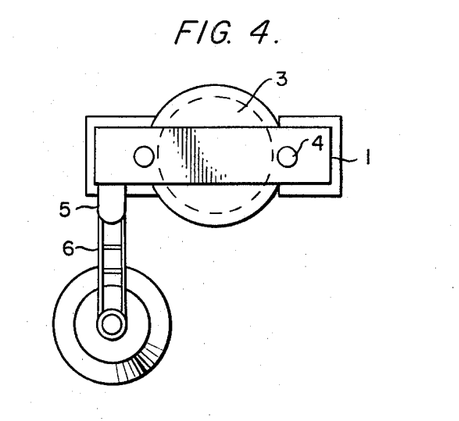
FIG. 4 is a plan view of the vulcanizing press shown in FIG. 3.

As shown in FIGS. 3 and 4, a vulcanizing press includes a lower die 2 fixed to a lower portion of a press frame 1 and an upper die 3 vertically movably mounted in the press frame 1. The upper die 3 is connected to rods of hydraulic cylinders 4 mounted on the press frame 1. A loader lifter 5 is mounted on the press frame 1 and has a loader arm 6 movable upwardly and downwardly and angularly movable. The loader arm 6 supports on its distal end a gripper assembly for gripping and loading a green tire into the upper and lower dies 2, 3.

Figure 5:
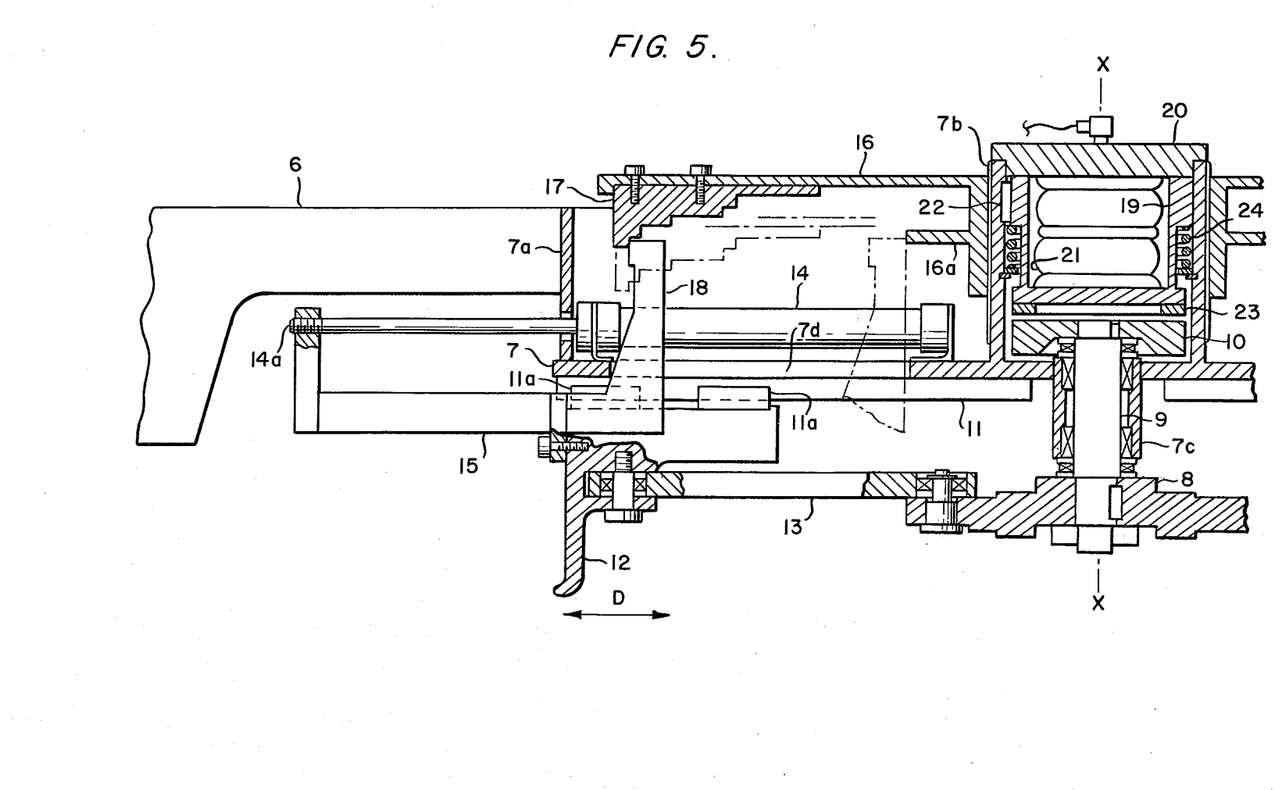
FIG. 5 is an enlarged cross-sectional view of a green tire gripper assembly on a distal end of a loader arm in the vulcanizing press of FIG. 4.

The gripper assembly will be described in greater detail with reference to FIG. 5.

A disk 7 is secured to the loader arm 6 and has a cylindrical rib 7a on its outer peripheral portion. The disk 7 also has a central cylinder 7b which is externally threaded, and a central boss 7c in which a shaft 9 is rotatably mounted by a bearing. A disk 8 is rotatably mounted on a lower end of the shaft 9, and another disk 10 is fixed to an upper end of the shaft 9.

Tracks 11 each comprising a linear motion bearing are fixed to a lower surface of the disk 7 and extend radially outwardly from a central axis X—X. A nut 11a is mounted on each of the tracks 11 with a gripper 12 affixed to the nut 11a.

The disk 8 and each of the grippers 12 are interconnected by links 13. The disk 7 supports thereon pneumatic cylinders 14 extending radially along the tracks 11, respectively, and each having a rod end 14a secured to a bracket 15 projecting radially outwardly from one of the grippers 12.

A stop arm 18 projects upwardly from the gripper 12 through a radial recess 7d defined in the disk 7. The stop arm 18 abuts against a stepped surface of a stop 17 attached to a disk 16 threaded on the externally threaded cylinder 7b. The cylinder 7b houses therein a cylinder 19 guided therein for up-and-down movement, an air spring 21 accommodated between a plate 20 fixed to an upper end of the cylinder 7b and a friction plate 23 attached to a lower end of the cylinder 19, a key 22 preventing rotation of the cylinder 19, and a spring 24 for lifting the cylinder 19 upwardly to urge the friction plate 23 to move away from the disk 10. The stops 27 are shaped to provide a desired gripping diameter D for the grippers 12 upon engagement of the stop 27 with the stop arms 18. The stepped surface of the stops 27 provide a selection of varying gripping diameters D. Rotation of the disk 16 causes the stop 17 to change its vertical position as shown in the dot-and-dash lines. It is preferable to align the pitch of the external threads on the cylinder 7b with the height of the steps of the stop 17 for thereby selecting different steps each time the disk 16 makes one revolution. The disk 16 also has a smaller-diameter disk 16a engageable with the stop arms 18 when the grippers 12 move radially inwardly. The disk 16a thus provides a radially inward limit for the stop arms 18.

The disk 16 is rotated until the stop arms 18 abut against the stops 17 to allow the grippers 12 to have a gripping diameter D suitable for the inside diameter of the beads of a green tire to be gripped. The disk 16 is then fixed to complete the positional adjustment of the stops 17. When the loader arm 6 is in a position (hereinafter referred to as a "first position") to grip the green tire, the pneumatic cylinders 14 are retracted to position the grippers 12 radially inwardly.

The loader is moved downwardly toward the green tire placed below the first position. When a detector detects arrival of the loader at the first position, the loader is stopped in its downward movement. The pneumatic cylinders 14 are then extended to grip the green tire from inside. The gripping diameter is limited to the desired diameter by the stop arms 18 and the stops 17. After the tire gripping has been detected by the detector, the loader is raised up to a desired height.

During this time, air under pressure is introduced into the air spring 21.

When the vulcanizing press is ready for receiving the green tire, the loader is swung from the first position to a central position (hereinafter referred to as a "second position") between the upper and lower dies, in which the loader is stopped and lowered until the lower bead of the tire is seated on the lower die. During this time, the air spring 21 is released so as not to prevent the closing of the grippers 12, that is, the rotation of the disk 8.

At a suitable time after the green tire has been released, the cylinders 14 are contracted to move the grippers 12 radially inwardly to allow the green tire to be completely disengaged from the loader. After release of the green tire, the loader is moved back to the first position again and actuated in preparation for gripping a next green tire.

With the loader construction of the foregoing embodiment, the grippers 12 can be moved smoothly on and along the tracks 11 with an extremely small force by extending and retracting the pneumatic cylinders 14 without supplying air under pressure into the air spring 21. The radially outward limit of the grippers 12 is accurately controlled by the stops 17 on the disk 16 and the stop arms 18 on the grippers 12, for thereby assuring a desired circular arrangement of the grippers 12.

Since the grippers 12 can be radially moved inwardly and outwardly with a small force, the pneumatic cylinders 14 can be of a small size. When the loader arm 6 is abruptly stopped as in emergency while moving from the first position to the second position after the grippers 12 have been moved radially outwardly, the grippers 12 are subjected to a force due to inertia of the green tire gripped by the grippers 12. Although the small-size pneumatic cylinders 14 are incapable of overcoming such a force of inertia, the air spring 21 is actuated during the swinging movement of the loader arm 6 to pressurize the disk 10 to thereby hold the disk 8. This can prevent the grippers 12 from being closed through the links 13.

The pneumatic cylinders 14 for moving the grippers 12 radially outwardly and inwardly are arranged radially in alignment with the tracks 12, respectively, for imposing forces directly on the grippers 12. Accordingly, the overall height of the tire loader can be held to a minimum.

The links 13 should be coupled to the grippers 12 and the disk 8 so that the links 13 will not act as braces when the grippers 12 are moved by the pneumatic cylinders 14. Such an arrangement will be readily be understood by those skilled in the art, and hence will not be described here.

Figure 6:
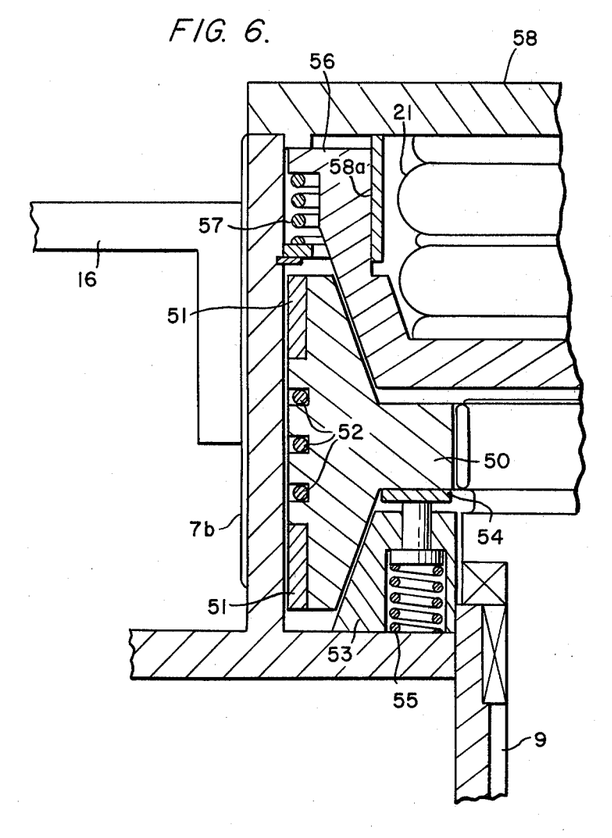
FIG. 6 is a cross-sectional view showing a different brake means from the brake means as illustrated in FIG. 5.

A more powerful braking means may be employed as shown in FIG. 6.

In FIG. 6, a shaft 9 has teeth around its upper end which are held in mesh with teeth on a plurality of segments 50 jointly having an outer cylindrical surface fitted snugly in the cylinder 7b and also having inner conical surfaces.

Friction liners 51 are mounted on upper and lower outer peripheral surfaces of the segments 50, and C-shaped rings 52 are assembled around the segments 50 to urge the latter to move radially inwardly. A cone 53 is placed below the segments 50 in fitting engagement with the lower conical surface. A sliding plate 54 is held against the segments 50 resiliently under the force of a spring 55. The sliding plate 54 serves to facilitate rotation of the segments 50 by the shaft 9 upon release of the brake. A cone cylinder 56 is positioned upwardly of the segments 50 in fitting engagement with the upper conical surface. The cone cylinder 56 is lifted by a spring 57 when the air spring 21 is not supplied with air under pressure. The cone cylinder 56 is guided axially by a cylinder 58a extending downwardly from a plate 58 affixed to an upper end of the cylinder 7b. The air spring 21 is accommodated between the cone cylinder 56 and the plate 58.

When air under pressure is supplied into the air spring 21, the cone cylinder 56 is pushed downwardly to spread the segments 50 radially outwardly under a force which is increased by the conical surfaces. The segments 50 are pressed against an inner cylindrical surface of the cylinder 7b, whereupon the friction liner 51 is forcibly held against the inner cylindrical surface of the cylinder 7b to thereby produce a large braking torque.

When air is removed from the air spring 21, the cone cylinder 56 is raised by the spring 57. The sliding plate 54 is lifted by the spring 55, and the segments 50 are displaced radially inwardly by the C-shaped rings 52.

Rotation of the shaft 9 causes the segments 50 to be moved radially inwardly from the cylinder 7b and rotated while being supported by the sliding plate 54.

Figure 7:
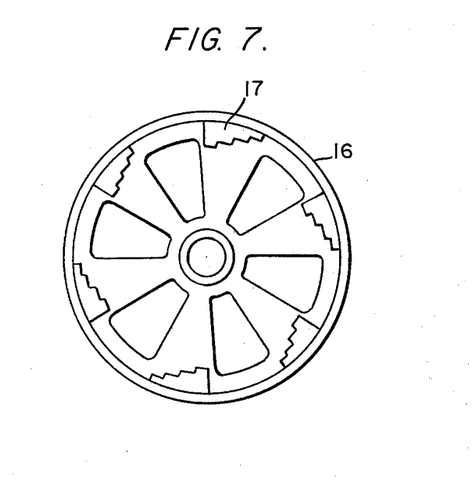
FIG. 7 is a plan view of a stop different from the stop as shown in FIG. 5.

The stepped stops 17 may be arranged circumferentially around the disk 16 as shown in FIG. 7. In such a modification, the disk 16 should only rotate around the cylinder 7b, and requires no threaded connection.

A tire loader according to a second embodiment will be described with reference to FIGS. 8 through 10.

A vulcanizing press includes a lower die 102 fixed to a lower portion of a press frame 101 and an upper die 103 vertically movably mounted in the press frame 101. The upper die 103 is connected to rods of hydraulic cylinders 104 mounted on the press frame 101. A loader lifter 105 is mounted on the press frame 101 and has a loader arm 106 movable upwardly and downwardly and angularly movable from a green tire gripping position (hereinafter referred to as a "first position") to a position (hereinafter referred to as a "second position") in which a green tire is seated on the upper die 103. The loader arm 106 supports on its distal end a gripper assembly for gripping a green tire.

A disk 111 is secured to the loader arm 106 and has a cylindrical rib 111a on its outer peripheral portion. The disk 111 also has a central cylinder 111b which is externally threaded, and a central boss 111c in which a shaft 113 is rotatably mounted by a bearing. A disk 112 is rotatably mounted on an upper end of the shaft 113, and another disk 114 is fixed to a lower end of the shaft 113. Tracks 115 each comprising a linear motion bearing are fixed to an upper surface of the disk 111 and extend radially outwardly from a central axis X—X of the shaft 113. A nut 115a is mounted on each of the tracks 115 with a gripper 116 affixed to the nut 115a.

The disk 112 and each of the grippers 116 are interconnected by links 117. The disk 111 supports thereon pneumatic cylinders 118 extending radially along the tracks 115, respectively, and each having a rod end 118a secured to a bracket 119 projecting radially outwardly from one of the grippers 116.

A stop arm 122 projects upwardly from the gripper 116 through a radial recess 111d defined in the disk 111. The stop arm 122 abuts against a stepped surface of a stop 121 attached to a disk 120 threaded on the externally threaded cylinder 111b. The cylinder 111b houses therein a cylinder 123 guided therein for up-and-down movement, an air spring 125 accommodated between a plate 124 fixed to a lower end of the cylinder 111b and a friction plate 127 attached to an upper end of the cylinder 123, a key 126 preventing rotation of the cylinder 123, and a spring 128 for pushing the cylinder 123 downwardly to urge the friction plate 127 to move away from disk 114. The stops 121 are shaped to provide a desired gripping diameter D for the grippers 116 upon engagement of the stop 121 with the stop arms 122. The stepped surface of the stops 121 provide a selection of different gripping diameters D. Rotation of the disk 120 causes the stop 121 to change its vertical position as shown in the dot-and-dash lines. It is preferable to align the pitch of the external threads on the cylinder 111b with the height of the steps of the stop 121 for thereby selecting different steps each time the disk 120 makes one revolution.

The disk 120 also has a smaller-diameter disk 120a engageable with the stop arms 122 when the grippers 116 move radially inwardly. The disk 120a thus provides a radially inward limit for the stop arms 122.

The grippers 116 can be moved smoothly on and along the tracks 115 with an extremely small force by extending and retracting the pneumatic cylinders 118 without supplying air under pressure into the air spring 125. The radially outward limit of the grippers 116 is accurately controlled by the stops 121 on the disk 120 and the stop arms 122 on the grippers 116, for thereby assuring an accurate radial position of the grippers 116.

Since the grippers 116 can be radially moved inwardly and outwardly with a small force, the pneumatic cylinders 118 can be of a small size. When the loader arm 106 is abruptly stopped while moving from the first position to the second position, the grippers 116 undergo a force due to inertia of the green tire gripped by the grippers 116. Although the small-size pneumatic cylinders 118 are incapable of overcoming such a force of inertia, the air spring 125 is actuated during the swinging movement of the loader arm 106 to pressurize the disk 114 to thereby hold the disk 112. This can prevent the grippers 116 from being closed through the links 117.

The links 117 should be coupled to the grippers 116 and the disk 112 so that the links 117 will not act as braces when the grippers 116 are moved by the pneumatic cylinders 118. Such an arrangement will be readily be understood by those skilled in the art, and hence will not be described here.

Each of the radially movable grippers 116 has a radially outward projection 116a to which there is fixed a track 129 in the form of a linear motion bearing extending radially with respect to a central axis X—X of the shaft 113. A nut 129a is mounted on the track 129 with a block 130 affixed to the nut 129a. A pneumatic cylinder 131 has a rod end mounted on the block 130. A lever 132 is pivotably attached to the block 130 and has an end swingably mounted on an arm 133 pivotally attached to the gripper 116. The projection 116a has a bracket 134 attached thereto with a bolt 135 threaded through the bracket 134. The bolt 135 has a distal end engageable with the block 130 to limit its position when the block 130 is moved radially outwardly (leftward as shown).

The arm 133 is angularly movable about its end pivotably connected to the gripper 116 in response to extension and retraction of the cylinder 131. A limit of such angular movement of the arm 133 is adjusted by the bolt 135. The opposite limit of the angular movement of the arm 133 is defined by a limit of the stroke of the cylinder 131.

With the arm 133 mounted on the gripper 116, the arm 133 can be angularly moved in any desired radial position of the gripper 116. The arm 133 is shaped for supporting the weight of the tread of a green tire when the latter is supported by the gripper 116 as shown in FIG. 10.

The pivots of the lever 132 should be positioned for supporting the heavy tread of the tire so that the tire weight can be borne effectively by a small force produced by the cylinder 131.

It is preferable that the arm 133 be limited in its downward movement as shown by the dot-and-dash lines below the green tire seat of the gripper 116 so that the arm 133 will not contact the tire T when the gripper 116 is moved radially outwardly and inwardly.

While the tire is being vulcanized by the press, the loader arm 106 is moved to the first position outside the press. The loader arm 106 is actuated to receive a next green tire in the following manner:

A green tire is moved downwardly from above the first position through a tire suspension unit (not shown) or by a manual operation and then stopped in the first position. The grippers 116 are spread to grip the lower bead of the green tire from inside. Then, the arm 133 is angularly moved upwardly until it holds a shoulder of the tread as shown in FIG. 10. When the green tire is released by the tire suspension unit, the lower bead of the tire is supported on the gripper 116 while the tread shoulder is supported on the arm 133.

Figure 8:
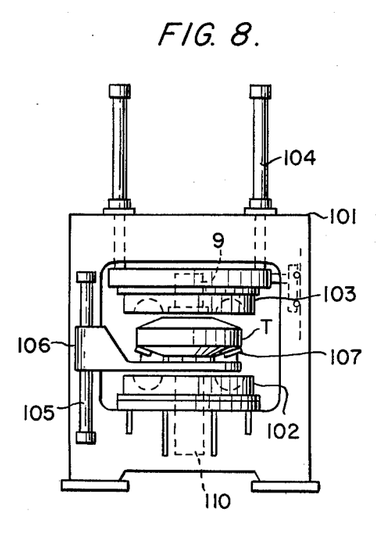
FIG. 8 is a front elevational view of a vulcanizing press incorporating a tire loader according to a second embodiment of the present invention.
Figure 9:
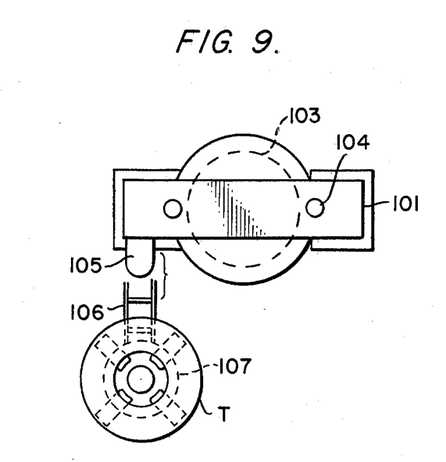
FIG. 9 is a plan view of the vulcanizing press shown in FIG. 8.

At the time the press is to be supplied with the green tire, the gripper assembly 107 is moved into the space between the lower and upper dies 102, 103 spaced from each other as shown in FIG. 8. After the loader arm 106 has stopped in the second position, a bead gripper on the upper die 103 approaches the upper bead of the green tire (Conversely, the green tire may approach the bead gripper). The bead gripper on the upper die has a spreader plate which is contracted at this time to a size smaller than the inside diameter of the bead of the tire.

An upper bead ring on the bead gripper on the upper die enters the upper bead of the green tire, and then the spreader plate as placed in the green tire is spread to a size greater than the inside diameter of the bead of the green tire.

Figure 10:
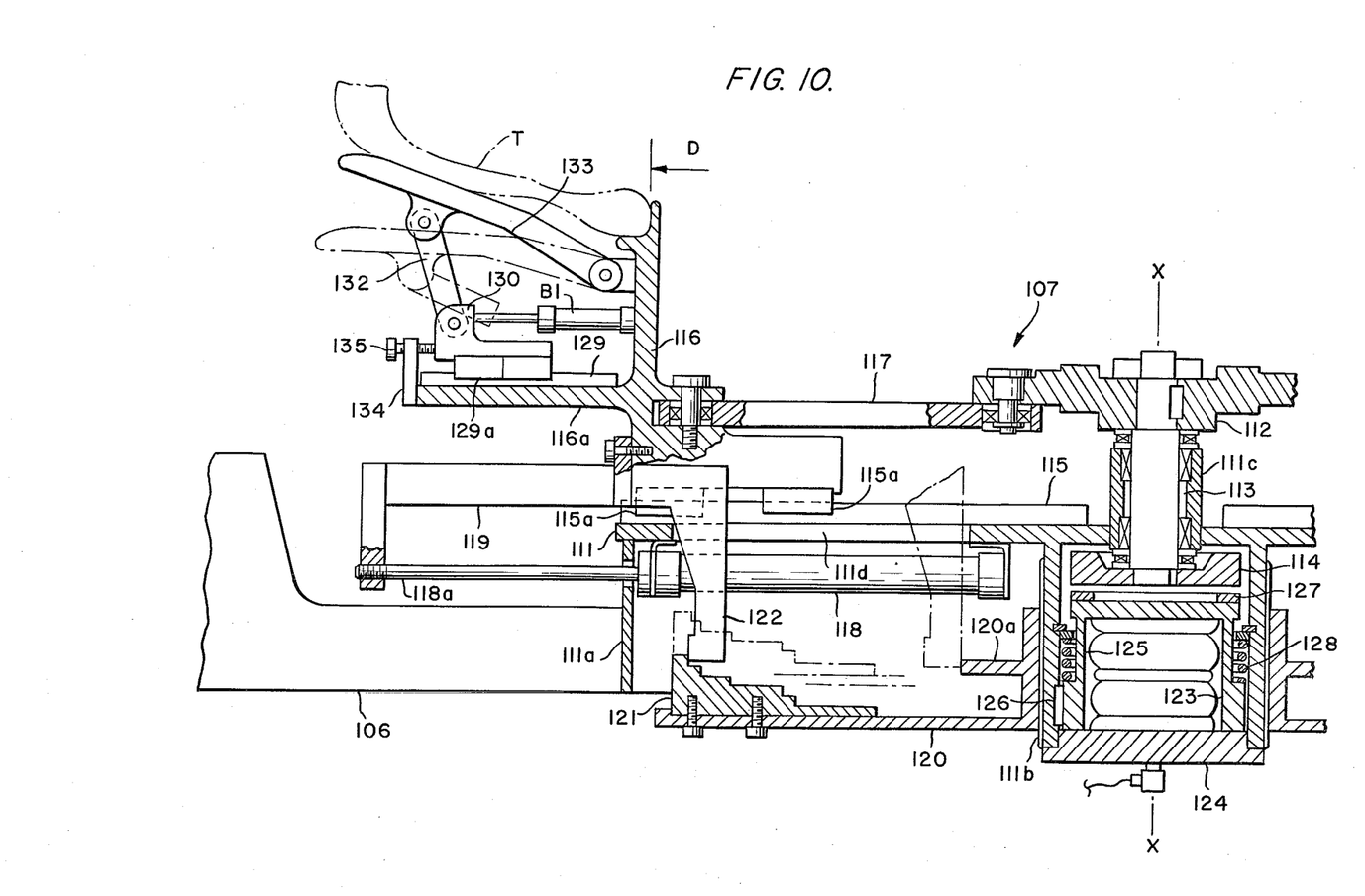
FIG. 10 is an enlarged cross-sectional view of a green tire gripper assembly in the vulcanizing press of FIG. 9.

Susequently, the arm 133 is turned downwardly toward the dot-and-dash-line position as shown in FIG. 10, and at the same time the gripper 16 is displaced radially inwardly. Then, the gripper assembly 107 is moved downwardly (The upper bead gripper on the upper die may instead be moved upwardly). The green tire is then obstructed by the spreader plate on the bead gripper on the upper die so as to be suspended while being seated on the upper bead ring.

After the loader arm 106 has been moved out of the press, the lower bead ring mounted in a central mechanism of the press is moved closely toward the lower bead of the green tire, or the lower bead is moved toward the lower bead ring, for enabling the lower bead to be seated on the lower bead ring. With the upper and lower beads of the green tire being thus seated on the upper and lower bead rings on the upper and lower dies, a bladder of a known construction is inflated into the green tire. The green tire is now shaped and then vulcanized in the closed upper and lower dies, thus building a tire.

The tire loader of the second embodiment can load green tires into a vulcanizing press on an upper-bead-set-first system. Since the green tire with the upper bead seated at first is suspended from a point higher than the center of gravity thereof, the lower bead ring on the lower die can easily enter the lower bead of the green tire while preventing the lower bead from being seated erroneously, reducing the rate at which tires are scrapped. While the bladder is being inflated, the tire is supported by the upper and lower bead rings for protection against collapsing as shown in FIG. 1, so that the tire can be shaped correctly and with an improved quality. More specifically, the green tire prior to being shaped is reliably seated on the upper and lower bead rings on the upper and lower dies while the bladder is being inflated. The tire can be shaped uniformly, and the rate of tire scrapping is reduced and at the same time the tire quality is improved.

Since the tread shoulder of the green tire is supported on the arm 133, the tire when it is loaded is prevented from collapsing and can have its upper bead seated reliably on the upper bead ring on the upper die.

Figure 11:
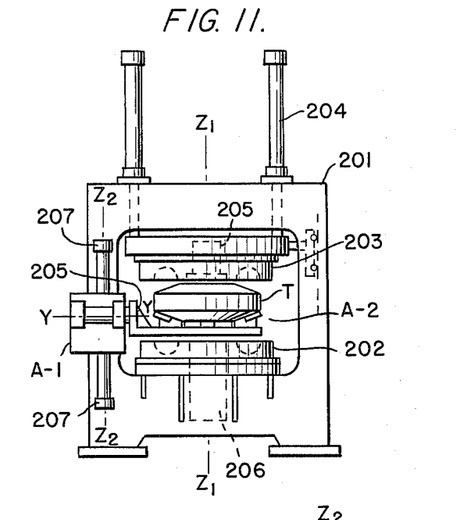
FIG. 11 is a front elevational view of a vulcanizing press incorporating a tire loader according to a third embodiment of the present invention.
Figure 12:
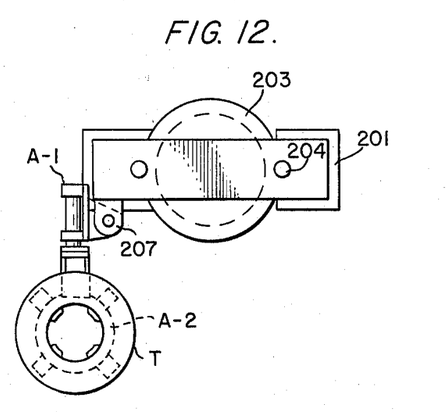
FIG. 12 is a plan view of the vulcanizing press shown in FIG. 11.
Figure 13:
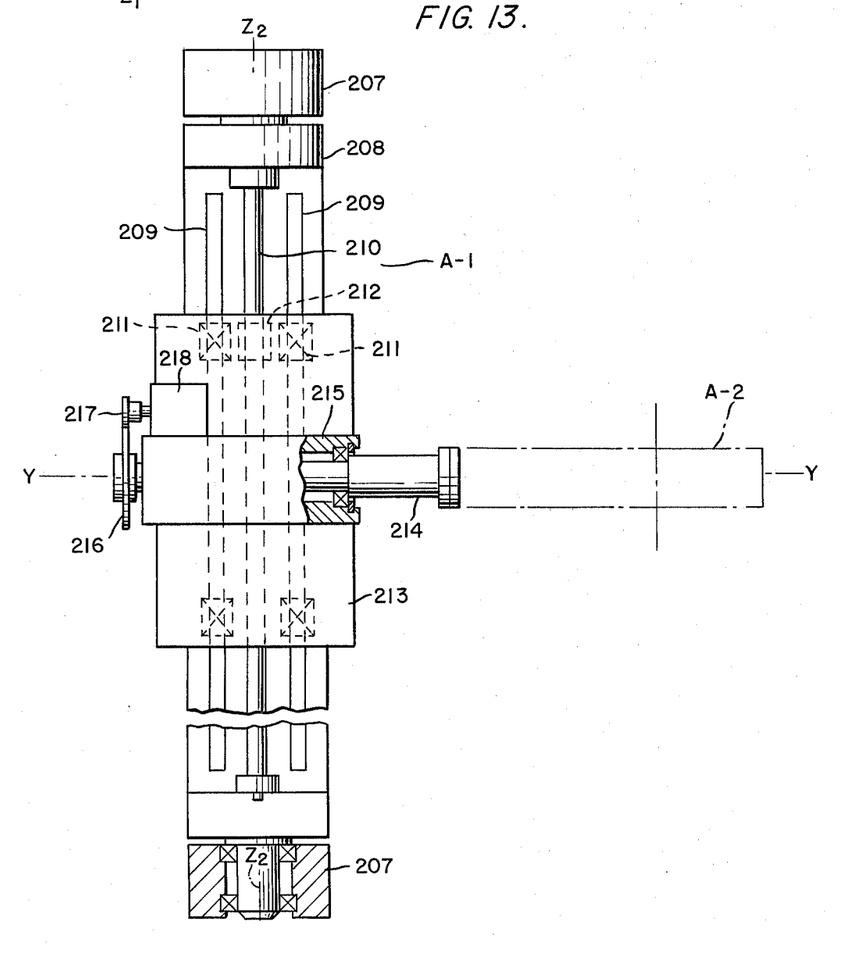
FIG. 13 is a fragmentary front elevational view of a tire loader according to a third embodiment.

A tire loader according to a third embodiment will be described with reference to FIGS. 11 through 13.

A vulcanizing press includes a press frame 201, a lower die 202 fixed to a lower portion of the press frame 201, an upper die 203 guided by the press frame 201, hydraulic cylinders 204 mounted on the press frame 201 for moving the upper die 203 upwardly and downwardly, an upper bead gripper device 205 movable in upward and downward directions of the press frame 201 and having an upper bead ring and a movable spreader plate which can spread within a green tire T at its upper bead, and a central mechanism 206 having a bladder inflation device.

A green tire loader A-1 is reciprocably movable angularly about an axis $Z_2$—$Z_2$ from a first position out of the press in which the tire loader receives a green tire to a second position aligned with the center of the press. The green tire loader A-1 supports thereon an extensible and contractible green tire gripper assembly A-2 angularly movable about a horizontal axis Y—Y.

The green tire loader A-1 comprises brackets 207 fixed to the press frame 201 and a guide member 208 mounted on the brackets 207 for angular movement around the vertical axis $Z_2$—$Z_2$ which extends parallel to a press axis $Z_1$—$Z_1$. The guide member 208 supports thereon tracks 209 each in the form of a linear motion beairng parallel to the vertical axis $Z_2$—$Z_2$. A threaded rod 210 is rotatably mounted on the guide member 208 and extends parallel to the tracks 209, the threaded rod 210 being drivable by a rotational drive unit. The green tire loader A-1 also includes bearing nuts 211 mounted on the tracks 209, a nut 212 threaded on the threaded rod 210, and a bracket 213 secured to the nut 212 and the bearing nuts 211 and movable vertically in the direction $Z_2$—$Z_2$ on the threaded rod 210 along the tracks 209. The bracket 213 supports a rotatable shaft 214 fixed to the extensible and contractible green tire gripper assembly A-2, a bracket 215 in which the shaft 214 is rotatably supported, a gear 216 affixed to an end of the shaft 214, a pinion 217 held in mesh with the gear 216, and a rotational drive unit 218 having an ouput shaft with the pinion 217 mounted thereon.

The rotatable shaft 214 to which the green tire gripper assembly A-2 is positionally adjustable in the vertical direction by the threaded rod 210 and angularly movable about both the vertical axis $Z_2$—$Z_2$ and the horizontal axis Y—Y.

The green tire gripper assembly A-2 may be of the same construction as that of the tire gripper assembly 107 shown in FIG. 10, and will not be described.

With the green tire loader A-1 thus constructed, the upper bead of a green tire T placed on a green tire mount disposed in the first position outside the press can be gripped from inside. By adjusting the limit of swinging movement of the arm 133 (FIG. 10) with the bolt 135 so that the arm 133 will contact the tread shoulder of the green tire T when the latter is suspended, the green tire T can be inverted upside down by rotating the shaft 214 at a position out of interference with the green tire mount.

The arm 133 can prevent the green tire T from being deformed due to a moment produced by the weight of a portion of the green tire T beyond the grippers 116 when the tire is turned upside down. The lower bead of the green tire T at the time it is received by the tire loader is brought upwardly after the tire is inverted into the position of FIG. 10. While the tire loader is being moved from the first position to the second position, the tread shoulder of the green tire is supported from below by the arm 133, which protects the weak lower side wall of the tire against yielding under the large weight of the tire tread.

The tire loader of the above construction will be described in its application to a lower-bead-set-first system.

In the first position outside of the vulcanizing press, the gripping diameter of the grippers 116 is smaller than the inside diameter of the bead of the green tire T, and the arm 133 is positioned in the dot-and-dash-line position shown in FIG. 10. The tire gripper assembly A-2 is open upwardly as illustrated in FIG. 10.

The green tire T is supplied from above, the grippers 116 are spread, and the arm 133 is lifted to the position of FIG. 10, whereupon the green tire T is supported on the green tire gripper assembly A-2. The green tire T remains supported in this manner until vulcanization of the previous green tire T in the press is finished in a preceding cycle.

After the prior green tire T has been vulcanized, the upper and lower press dies are separated from each other to discharge the completed tire out of the press. During this time, the green tire gripper assembly A-2 is turned upside down about the shaft 114 to bring the green tire into a suspended condition, and then the green tire loader A-1 is moved from the first to the second position. The green tire gripper assembly A-2 and the green tire loader A-1 may be respectively inverted and angularly moved at the same time.

The green tire T as it is suspended is stopped in the second position, and the green tire is is brought closely toward the lower bead ring on the lower die or the lower bead ring is moved closely toward the green tire until the lower bead of the green tire is seated on the lower bead ring.

After the lower bead of the green tire has been seated on the lower bear ring, a bladder is inflated into the green tire. At a suitable time thereafter, the green tire T is released from the arm 133 and the grippers 116. Then, the green tire loader A-1 is moved from the second to the first position. Prior to this movement, the green tire loader A-1 may sometimes be raised slightly as desired. In the first position, or on the way to the first position, the green tire gripper assembly A-2 is turned upside down.

Accordingly, the lower-bead-set-first method can be carried out on the tire loader of the invention through the foregoing process. The tire loader of the invention does not need any green tire mount which has conventionally been required in such a method. With the arrangement of the invention, green tires can successively be vulcanized, and any operation to replace dies is free from interference with a green tire mount which would otherwise be placed in front of the press.

Applications of an upper-bead-set-first method in the apparatus of the foregoing embodiment will be described.

(a) Small-size tires:

The process is the same as the lower-bead-set-first method unitl the green tire is supported on the green tire gripper assembly A-2. After vulcanization, the upper and lower press dies are separated, and the completed tire is ejected out of the press. During this time, the green tire gripper assembly A-2 on the green tire loader A-1 is moved from the first position back to the second position while in the condition as shown in FIG. 10. When the green tire T is stopped in the second position, the green tire T is moved closely toward the upper bead ring on the upper die or the upper bead ring on the upper die is brought closely toward the green tire T until the upper bead of the green tire T is seated on the upper bead ring. After the upper bead has been seated on the upper bead ring, the upper bead gripper device 205 grips the upper bead of the green tire T. Then, the green tire is released from the grippers 116 and the arm 133 of the green tire gripper assembly A-2. Thereafter, the green tire gripper assembly A-2 is lowered and moved from the second to the first position. The green tire loader A-1 and the green tire gripper assembly A-2 then repeat the foregoing cycle of operation.

The lower bead of the green tire with its upper bead gripped is seated on the lower bead ring by either moving the green tire closely toward the lower bead ring or moving the latter closely toward the green tire. With the upper and lower beads of the green tire seated respectively on the upper and lower bead rings, a bladder is inflated into the green tire T. Subsequently, the green tire T is vulcanized into a completed tire.

(b) Large-size tires:

A green tire is placed on a green tire mount in the first position. The green tire mount should preferably grip the lower bead of the tire and support the tread shoulder in a manner similar to that shown in FIG. 10. The green tire gripper assembly A-2 approaches the green tire from above. At this time, the green tire gripper assembly A-2 is inverted from the position illustrated in FIG. 10. The grippers 116 have a gripping diameter smaller than the inside diameter of the bead of the green tire, and the arm 133 is positioned as shown by the dot-and-dash lines in FIG. 10.

The green tire gripper assembly A-2 is stopped at a suitable height, and then the grippers 116 are spread to grip the upper bead of the green tire T. (The green tire gripper assembly may be slightly raised after the grippers 116 have gripped the upper tire bead.) The parts remain in this position until after the previous green tire T has been vulcanized in the prior cycle.

After the prior tire T has been vulcanized, the upper and lower press dies are separated from each other to discharge the completed tire out of the press. During this time, the next green tire T is released from the green tire mount, followed by upward movement of the green tire gripper assembly A-2.

The green tire gripper assembly A-2 is lifted up to a higher position in which the tire can be inverted without being disturbed by the green tire mount. During this lifting movement, the arm 133 is actuated into contact with the tread shoulder of the green tire as it is suspended.

Then, the green tire gripper assembly A-2 is turned upside down about the shaft 214. Thereafter, the green tire gripper assembly A-2 is moved from the first to the second position in which the green tire is stopped. The process from this point on is the same as that for vulcanizing small-size tires, and will not be described.

As described above, the tire loader of the above embodiment can be employed to carry out the upper-bead-set first method. Since in such an application the green tire is gripped from above, the green tire can be picked up directly from the green tire mount, an advantage which dispenses with a tire transfer device that has heretore been needed.

With the foregoing embodiment, the green tire loader includes the vertically movable member supporting thereon the extensible and contractible green tire gripper assembly for rotation about the horizontal axis and the guide member angularly movable about the vertical axis for guiding the vertically movable member. Alternatively, the green tire loader may have a vertically movable member supporting thereon the extensible and contractible green tire gripper assembly for rotation about the horizontal axis and having a pivot mounted for rotation about an axis perpendicular to the horizontal axis, and a guide member fixed to the press frame for guiding the vertically movable member. More specifically, the guide member 208 as shown in FIG. 10 may be secured to the press frame 201, and the bracket 215 by which the shaft 214 is rotatably mounted on the vertically movable bracket 213 may be arranged for roatation about a vertical axis parallel to the press axis $Z_1$—$Z_1$. Therefore, the guide member 208 is secured along its full length to the press frame 201 to provide increased rigidity and reduce the weight of the rotatable parts. This minimizes any influence of the force of inertia at the time of stoppage of the tire loader for thereby enabling easy positional control of high accuracy.

Although certain preferred embodiments have been shown and described, it should be understood that many changes and modifications may be made therein without departing from the scope of the appended claims.

What is claimed is:

1. A tire loader for supplying a green tire into a vulcanizing press, comprising:
   (a) a plurality of guide tracks extending radially outwardly;

(b) a plurality of grippers movably mounted on said guide tracks, respectively, for gripping a bead of the green tire in contact therewith;

(c) a plurality of fluid pressure cylinders having rods connected respectively to said grippers and actuatable for moving said grippers along said guide tracks; and (d) a stop means for limiting the radially outward movement of each of said grippers along said guide tracks.

2. A tire loader according to claim 1, wherein said stop means comprises a stepped surface for providing different radial end positions to which said grippers are movable along said guide tracks.

3. A tire loader according to claim 1, wherein each of said guide tracks comprises a linear motion bearing and a nut mounted thereon, one of said grippers being secured to a corresponding nut.

4. A tire loader according to claim 1, further comprising a central shaft and a movable disk mounted thereon, links connecting said grippers to said movable disk, said movable disk being rotatable about said central shaft when said grippers are moved radially outwardly and inwardly, and means for preventing said movable disk from rotating when said grippers abut against said stop means.

5. A tire loader according to claim 4, in which said preventing means comprises brake means for braking said movable disk against rotation about said central shaft.

6. A tire loader as claimed in claim 1 further comprising a plurality of radially outward extending arms pivotably mounted on said grippers for supporting at least a tread shoulder of the green tire.

7. A tire loader according to claim 6, further including means for adjusting a limit of pivoting movement of said arms.

8. A tire loader for supplying a green tire into a vulcanizing press, comprising a plurality of grippers movable radially outwardly and inwardly for gripping a bead of the green tire, a horizontal shaft having said plurality of grippers thereon, said horizontal shaft being rotatable about the longitudinal axis thereof, first means for angularly moving said shaft in a horizontal direction, and second means for moving said shaft upwardly and downwardly and third means connected to said horizontal shaft for rotating said shaft about said longitudinal axis, whereby said third means rotates said horizontal shaft for inverting a tire gripped by said grippers.

9. A tire loader according to claim 8, further comprising press frame, said second means comprising a vertical guide track mounted on said press frame, and a bracket mounted on said guide track for upward and downward movement therealong, said shaft being rotatably mounted on said bracket.

* * * * *